Figure 1:
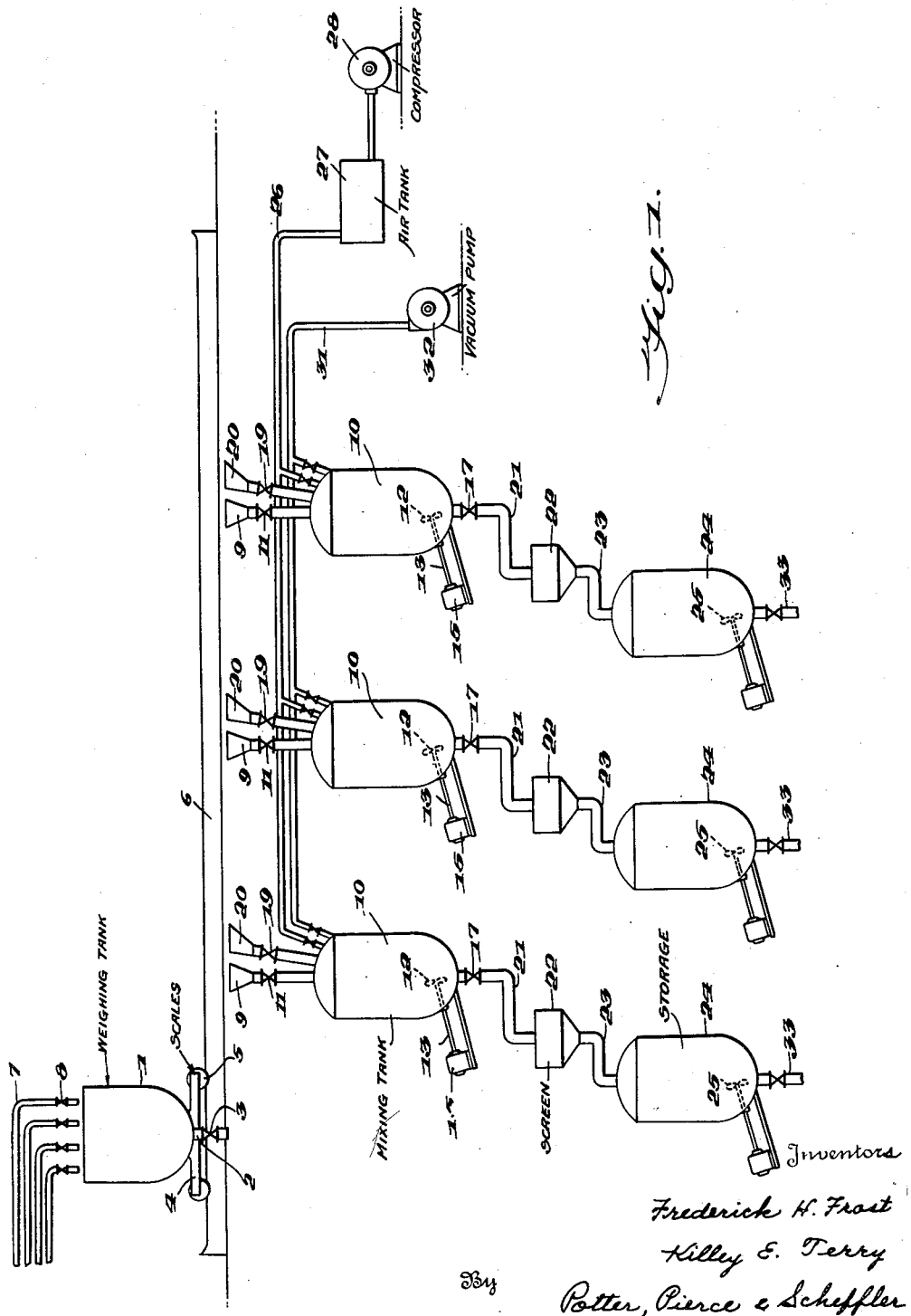

March 31, 1942.     F. H. FROST ET AL     2,277,952
PREPARATION OF MINERAL-COATING COMPOSITION
Filed Jan. 2, 1940     2 Sheets-Sheet 1

Inventors
Frederick H. Frost
Killey E. Terry
By Potter, Pierce & Scheffler
Attorneys March 31, 1942.  F. H. FROST ET AL  2,277,952
PREPARATION OF MINERAL-COATING COMPOSITION
Filed Jan. 2, 1940   2 Sheets-Sheet 2
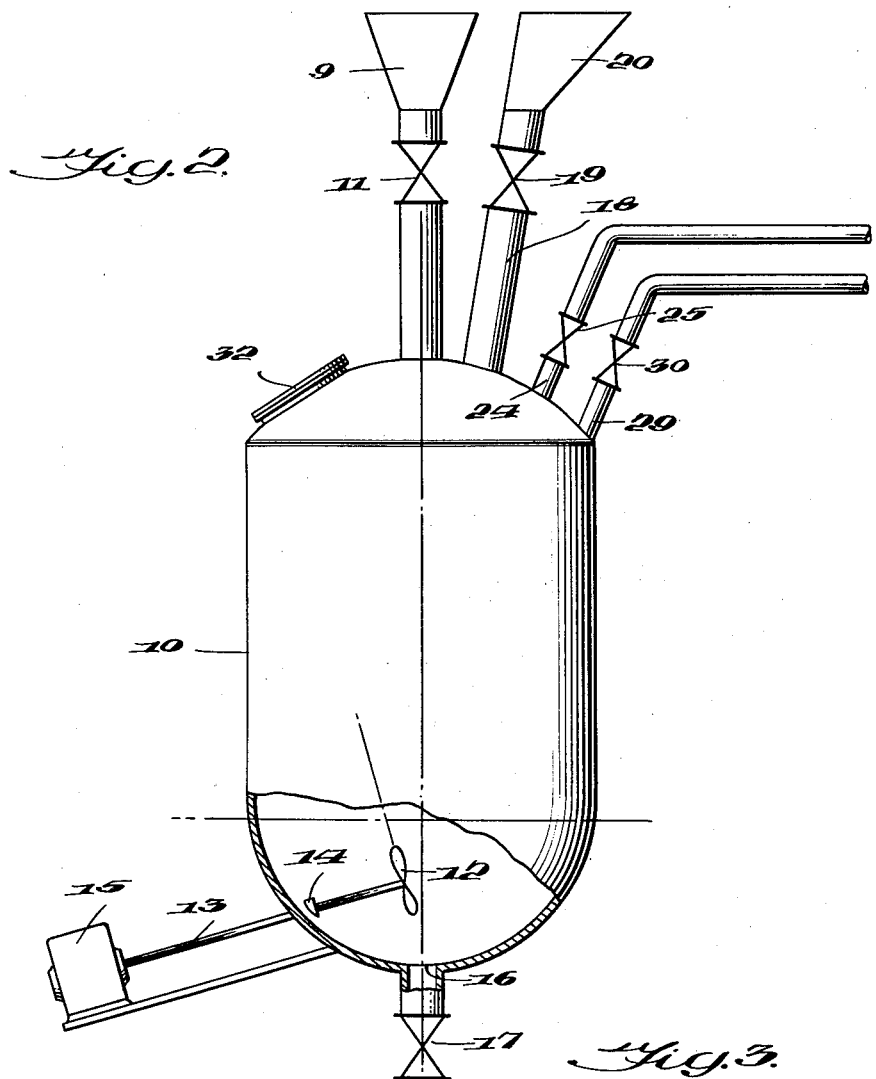
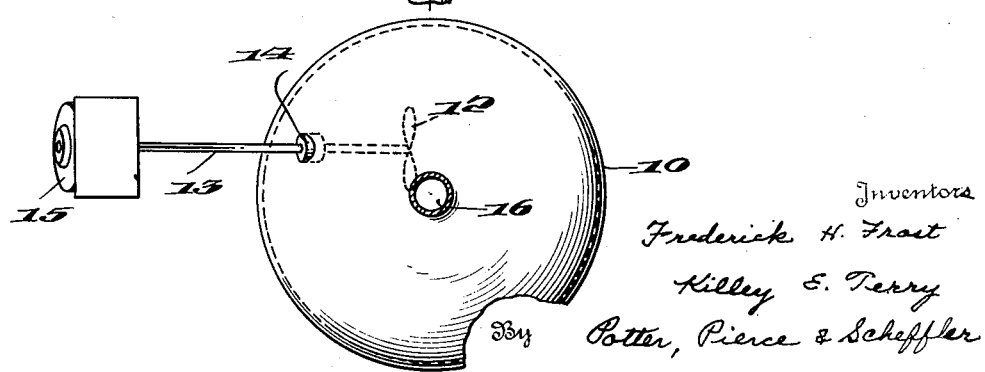
Inventors
Frederick H. Frost
Killey E. Terry
By Potter, Pierce & Scheffler
Attorneys Patented Mar. 31, 1942

2,277,952

UNITED STATES PATENT OFFICE 2,277,952

PREPARATION OF MINERAL-COATING COMPOSITION

Frederick H. Frost, Portland, and Killey E. Terry, Westbrook, Maine, assignors to S. D. Warren Company, Boston, Mass., a corporation of Massachusetts Application January 2, 1940, Serial No. 312,106

3 Claims. (Cl. 106—146)

This invention relates to improvements in methods and apparatus for preparing mineral-coating compositions.

In the manufacture of paper for use as high-grade printing-paper, such as paper used for fine half-tone reproduction, it is customary procedure to apply to a paper web (base-stock) a layer of an aqueous suspension of mineral pigment and organic adhesive; the web is then dried and finished in any manner desired. Paper so made is generally referred to as "mineral-coated paper," and the aqueous suspension of pigment and adhesive is called a "mineral-coating composition". The pigments generally used include china clay, blanc fixe, calcium carbonate, zinc sulphide, titanium dioxide, and the like. For the better grades of mineral coated paper, the adhesive generally used in the mineral-coating composition is casein dissolved by alkali.

The coating composition is applied to the web of body stock by means of a coating machine, of which there are several types in common use. Customarily each coating machine has associated therewith equipment for preparing the coating composition to be used by said coating machine. Generally, such equipment comprises (1) a dissolving or cooking tank for the casein (or other organic adhesive used), (2) a mixing tank for blending the aqueous adhesive and pigments, and (3) a storage or supply tank to contain the completed mixture and to supply same to the associated coating machine.

According to the procedure heretofore employed for preparing the mineral-coating composition, ground dry casein was mixed with cold water in the casein cooking tank, alkali was added, the mixture was stirred constantly—usually by some form of paddle agitator—while the temperature of the mixture was raised, usually by admission of steam to a jacket surrounding the tank—until the casein was dispersed. The pigment or pigments of the composition were then placed in the mixing tank, being added either in aqueous dispersion or in the dry state to be worked into aqueous suspension in the tank itself. The dissolved casein from the cooking tank was then admixed with the pigment in the mixing tank, and stirring was continued until the composition was uniformly mixed. The most common type of stirrer heretofore employed was an agitator with paddle arms, which gave fairly good agitation but which had to be relatively slow in its movement in order not to whip excessive amounts of air into the composition to the production of froth. After the composition had been stirred for a considerable time, long enough to insure uniform mixing, it was passed to the storage tank, usually on the way passing through a screen or other device to remove dirt or coarse material.

The principal object of the present invention is to simplify and improve methods and apparatus for preparing mineral coating compositions. Ancillary thereto, it is an object of the invention to provide a preparing apparatus having fewer parts, which apparatus is adapted to the production of superior mineral-coating composition with better economy, than the preparing apparatus heretofore employed for this purpose. Another object of the invention is the provision of a simplified process of preparing mineral-coating composition, which process is adapted to produce said composition more expeditiously and with better economy throughout.

In the practice of the present invention a separate casein dissolving or cooking tank is not employed. Instead, the casein is dissolved, and the mineral-coating composition is completely prepared, in a specially constructed mixing vessel fitted with a cutting agitator designed to give strong and rapid agitation without incorporating excessive amounts of air. Said mixing vessel is a closed, substantially vertical, cylindrical tank having a capacity suited to the coating machine it is to supply. The height of the tank is at least as great as, and preferably about twice as great as, the diameter. The bottom of the vessel preferably is substantially hemispherical. Within the hemispherical bottom is a cutting agitator, such as a propeller mounted on a shaft, which is totally submerged when the bottom of the vessel is filled.

The propeller is mounted on the inner end of a shaft which extends upwardly into the vessel through the shell of the hemispherical bottom thereof at a small angle with the horizontal. The axis of the propeller shaft is disposed wholly below the horizontal diameter of the hemispherical bottom. The horizontal projection of the axis of the shaft is parallel to a horizontal diameter of the hemisphere and is spaced from the same by a small fraction (e. g., one-fourth, more or less) of the distance between the vertical axis of the vessel and its periphery. It has been found that an agitator of the type described, when positioned as specified in a vessel of the design disclosed, is capable of maintaining good circulation of liquid throughout the vessel without stirring in air to any appreciable extent. Advantageously, the agitator is provided with a variable speed drive so that the speed may be high for viscous or heavy mixtures and may be reduced for more fluid mixtures that tend to swirl easily. Thus, severe beating of heavy mixtures is assured, while at the same time it is possible to stir a more easily agitated mixture without forming a pronounced vortex in the liquid. The cutting action of the agitator is effective in obtaining very rapid mixing of the ingredients of the composition, in eliminating possibility of lump formation therein, and in rapidly disintegrating any lumps of solids which may be added to the system.

According to the process of the invention, a predetermined quantity of ground or otherwise relatively finely divided casein, in substantially dry or air-dry condition, is delivered into a predetermined quantity of hot water, preferably having a temperature of at least 125° F., and in any case of at least 115° F., contained in the vessel just described. The water is stirred constantly during the addition of the casein. A predetermined quantity of casein solvent, sufficient to effect dispersion of the casein, is added to the mix, and stirring is continued until the casein is thoroughly dispersed. Suitable common casein solvents include sodium hydrate, sodium salts such as the borate, carbonate, fluoride, phosphate, or silicate, ammonia water, triethanolamine and the like. The stirring during the dissolving period should provide strong agitation, but whipping of air into the mixture should be avoided. It is found that the severe beating, well below the surface of the liquid, made possible by the use of the apparatus above described, materially shortens the time required for solution of the casein. It is to be noted that the casein is added directly to hot water, in contrast to the previous custom of first swelling the casein in cold water; also, that the mixture is not further heated, thus avoiding all possibility of local overheating of the casein,—as may obtain when the mixture including casein is "cooked." Quite obviously, the elimination of the customary swelling period and of the time required to heat the mixture to the "cooking" temperature further materially reduces the time required to dissolve the casein.

As a result of the substantial decrease in the time consumed in dissolving the casein in the manner described, it becomes perfectly feasible to dissolve the casein and to prepare the complete coating composition in the same vessel. Thus is avoided the prior art uncertainty as to how much of the casein charged to the dissolving kettle is actually added to the coating mixture and how much sticks to the walls of the dissolving vessel. Thereby, the equipment required is simplified by the elimination of the usual casein dissolving tank.

After the casein has been well dispersed or "dissolved," the stirring or beating is continued while a predetermined quantity of pigment, in the form of an aqueous suspension or slurry thereof, is introduced into the vessel containing the dissolved casein. The stirring, that is to say, the beating beneath the surface of the mixture, is continued until the mixture is uniformly blended. It is found that severe sub-surface beating of the coating mixture, as described, is effective for bringing about satisfactory blending of the composition in a much shorter time than is necessary in the case of agitation by paddle arms as has been customary in coating mills in the past. Furthermore, the method described absolutely eliminates the liability,—frequently occurring in prior art practice,—of lumps of casein or of pigment from going through the process without being broken up and thoroughly dispersed.

After the coating composition has been sufficiently mixed, gas under pressure, e. g., compressed air, may be admitted into the vessel in the free space above the mixture whereby to force the composition from the vessel. The composition may be conducted either to a storage tank or directly to the coating machine, as desired. Generally, it is preferable to pass the composition through a screen or some other form of separating device to remove particles of dirt and the like that may be present.

The use of a propeller placed low in the mixing vessel to beat the mixture largely avoids whipping air into the mixture. If, however, due to the particular casein used or to some other cause, the coating composition is unduly foamy, the mixture, before being taken from the mixing vessel may be subjected to sub-atmospheric pressure to reduce the foam and remove entrapped air. The subsequent admission of gas under pressure to force the composition from the vessel is effective for collapsing most of the remaining foam bubbles, if any persist in the "vacuum" treatment.

Obviously, in order to use compressed gas upon the contents of the mixing vessel it must be possible to close all openings into the vessel at will, by suitable valves or the like. The fact that the vessel can be made tight is advantageous when the casein solvent used comprises ammonia, because in using such a tank it is possible to avoid loss of ammonia from the system. In prior practice when ammonia has been used as a casein solvent it has been customary to supply a considerable excess of ammonia in order to insure complete solution of the casein in spite of the loss of ammonia into the atmosphere: by the improved process of the present invention, a distinct saving in ammonia required may be achieved, and at the same time escape of disagreeable fumes into the work room is largely prevented.

The economic advantage in eliminating the need for a separate jacketed casein dissolving tank from the system is obvious.

An incidental but very real advantage resulting from the invention is the ease with which the equipment may be kept clean. The mixing vessel, being equipped with a totally submerged agitator, and its interior being free from projections, offers little possibility for accumulation of dried coating composition. The fact that evaporation is largely prevented by using a closed vessel also lessens the liability of formation of dried deposits of composition on the walls of the same. As a result, the mineral coating compositions prepared in the equipment are wholly free from lumps of dried composition occurring occasionally in coating mixtures of the prior art. When the mixing vessel of the present invention has been emptied it may quickly and easily be completely cleaned merely by removing a manhole cover and flushing the interior by means of a stream of water.

Where,—as usually obtains,—the coating plant includes a plurality of coating machines to be served with mineral-coating composition, it may be advantageous to employ a plurality of the above-described mixing vessels,—without, or preferably with, associated storage tanks. The plurality of mixing vessels may be served with ingredients of the composition by a single movable weighing tank operating at a level sufficiently above the mixing vessels to permit gravity discharge of ingredients from said weighing tank into one or another of the mixing vessels at will. The movable weighing tank may, in turn, be provided with ingredients of the composition from one or another of a plurality of ingredient-storage tanks or containers located at a level sufficiently above the movable weighing tank to permit gravity flow of ingredients from such storage points to said movable weighing tank.

The invention will now be explained in greater detail in the following, and with reference to the accompanying drawings, in which Fig. 1 is a schematic representation of a satisfactory arrangement of equipment for carrying out the invention, Fig. 2 is a schematic showing in greater detail of a preferred form of mixing vessel for use in carrying out the process disclosed herein, and Fig. 3 is a plan view showing the disposition of the agitator and agitator shaft of the mixing vessel schematically illustrated in Fig. 2.

The numeral 1 represents an open tank having at its lowest point an outlet 2 having means 3 for opening and closing said outlet. Tank 1 is supported upon a weighing device 4 which in turn is mounted on trucks 5 movable upon rails 6. Hot water, pigments in aqueous suspension, or other fluid material, may be introduced into tank 1 from pipe lines 7 through valves 8 from sources (not shown) of such ingredients. The weighing unit 1, 4, 5 may be moved upon rails 6 until directly over a selected one of the mixing vessels 10, positioned on a lower level, and its contents may be discharged into selected mixing vessel 10 through inlet 9 which may be opened or closed at will by closure means 11.

Mixing vessel 10 is a closed cylindrical tank having a diameter less than its height, and preferably having a hemispherical bottom, or at least a bottom portion which slopes gradually to a low point, at which low point is an outlet 16 and closure means 17 for closing the outlet. Near the bottom of the tank 10, where it will be completely immersed by any considerable quantity of liquid present in the tank, is a small high-speed propeller type of stirrer 12, mounted on rotatable shaft 13 which passes through the water-tight bearing 14 in the wall of tank 10. Stirrer 12 is adjacent to, but spaced a few (e. g., six) inches from, the center line (vertical axis) of tank 10, and its plane of rotation is at a small angle (e. g., about 15°) from the vertical. On the outer end of shaft 13 is mounted means 15 for rotating said shaft, which rotating means suitably may be a variable-speed electric motor which may, if desired, be supported, as shown, by tank 10. In the top of tank 10 is a man-hole cover 32, as well as opening 24, fitted with valve 25, and connected by means of pipe 26 to pressure tank 27 which is filled with compressed gas (e. g., air) by compressor 28. Likewise in the top of tank 10 is an opening 29 fitted with valve 30 and connected by means of pipe 31 to vacuum pump 32. While, if desired, casein or other dry material may be fed into tank 10 through inlet 9 as well as liquid material, it is somewhat more convenient to feed dry material through a separate inlet 18, shown in Fig. 2, which is fitted with closing means 19 and connected to hopper 20.

When the coating composition has been prepared in tank 10 it may be drawn therefrom through pipe 21 to screen 22 which latter empties through pipe 23 into storage tank 24, in which the composition may be kept stirred by agitator 25 until it is required for use by the coating machine (not shown) served by said storage tank 24. Service of composition to coating machine advantageously may be effected by gravity flow through a valved discharge conduit indicated by the reference numeral 33.

It is advantageous to provide a separate mixing tank for each coating machine. One movable weighing tank, however, will serve a plurality of mixing vessels, as many as twelve of the latter being easily taken care of by one weighing tank.

The invention provides a simplified method of preparing mineral-coating compositions in which several customary steps and some customary equipment are eliminated; and an advantageous arrangement of apparatus is disclosed. The mineral-coating composition obtained is of superior, uniform, quality, and it is produced in a shorter preparing time than heretofore has been customary.

We claim:

1. Method of preparing a mineral-coating composition which comprises introducing into a vessel a predetermined quantity of hot water, stirring into the hot water a predetermined quantity of dry casein, adding a predetermined quantity of casein solvent, beating the mixture vigorously beneath its surface until the casein is well dispersed, adding a predetermined quantity of pigment in aqueous suspension to the casein dispersion, beating the resulting mixture vigorously beneath its surface until the mixture is well blended, and removing the resulting mineral-coating composition from the vessel by the aid of gas pressure.

2. Method of preparing a mineral coating composition which comprises stirring a measured quantity of dry casein into a measured quantity of hot water in a closed vessel, adding a measured quantity of alkali, continuing vigorous agitation until the casein is thoroughly dispersed, adding a measured quantity of aqueous suspension of pigment to the casein dispersion, continuing agitation until the mixture is thoroughly blended, subjecting the resulting body of mineral-coating composition to subatmospheric pressure in order to remove entrapped air, and applying gaseous pressure above the body of composition to force the latter from the vessel.

3. Method of preparing a mineral-coating composition which comprises introducing into a vessel a predetermined quantity of hot water, stirring into the water a predetermined quantity of dry casein, adding a predetermined quantity of casein solvent comprising ammonia, closing the vessel to prevent escape of ammonia, beating the mixture vigorously below the surface of the mixture until the casein is thoroughly dispersed, adding a predetermined quantity of pigment in aqueous suspension, beating the mixture vigorously below the surface until the mixture is well blended, and applying gaseous pressure to force the mixture from the vessel.

FREDERICK H. FROST.
KILLEY E. TERRY.